United States Patent
Ishii

(10) Patent No.: US 10,063,596 B2
(45) Date of Patent: Aug. 28, 2018

(54) DEVICES FOR MANAGING DATA ASSOCIATED WITH AN AUDIO COMMUNICATION

(71) Applicant: Sharp Laboratories of America, Inc., Camas, WA (US)

(72) Inventor: Atsushi Ishii, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 395 days.

(21) Appl. No.: 13/649,002

(22) Filed: Oct. 10, 2012

(65) Prior Publication Data

US 2014/0100680 A1  Apr. 10, 2014

(51) Int. Cl.
G06F 17/00 (2006.01)
H04L 29/06 (2006.01)
H04M 7/00 (2006.01)

(52) U.S. Cl.
CPC ........ *H04L 65/1006* (2013.01); *H04L 65/105* (2013.01); *H04L 65/1059* (2013.01); *H04L 65/1083* (2013.01); *H04M 7/0024* (2013.01); *H04M 2203/654* (2013.01)

(58) Field of Classification Search
CPC .............. H04L 29/06027; H04L 12/58; H04L 67/2804; H04L 65/1006; H04L 65/1083; H04L 65/1059; H04M 2215/0168; H04M 2215/202; H04M 7/0024; H04M 2203/65; H04M 2203/651; H04M 2203/652; H04M 2203/654; H04M 2203/655; H04M 2203/657; H04M 2203/658; H04W 4/001; H04W 4/02; H04W 4/18; H04W 76/025; G06F 3/165; G06F 3/167

See application file for complete search history.

(56) References Cited

U.S. PATENT DOCUMENTS

| | | | |
|---|---|---|---|
| 5,854,898 A * | 12/1998 | Riddle | H04L 12/1827 348/E7.081 |
| 6,865,161 B1 | 3/2005 | Sponaugle et al. | |
| 7,039,170 B1 | 4/2006 | Sylvain | |
| 7,881,447 B1 * | 2/2011 | Satapathy | H04L 12/1818 379/158 |
| 7,899,164 B2 | 3/2011 | Sylvain et al. | |
| 7,929,943 B2 | 4/2011 | Begeja et al. | |
| 2003/0022659 A1 * | 1/2003 | Mun | H04M 1/576 455/415 |

(Continued)

OTHER PUBLICATIONS

RCS-e-Advance Communications: Services and Client Specification Version 1.2, Nov. 28, 2011 found at http://www.gsma.com/rcs-product-specifications-rcs-e-specifications/, printed on Oct. 10, 2012.

*Primary Examiner* — Andrew C Flanders
(74) *Attorney, Agent, or Firm* — Austin Rapp

(57) ABSTRACT

An electronic device for managing data associated with an audio communication is described. The electronic device includes a processor memory in electronic communication with the processor. Executable instructions are stored in the memory. The electronic device establishes an audio communication. The electronic device also receives data. The electronic device further determines whether the data is associated with the audio communication. The electronic device additionally performs an operation based on the data if the data is associated with the audio communication.

24 Claims, 14 Drawing Sheets

(56) References Cited

U.S. PATENT DOCUMENTS

| | | | |
|---|---|---|---|
| 2003/0032413 A1* | 2/2003 | Aksu | H04W 4/20 |
| | | | 455/415 |
| 2003/0153337 A1* | 8/2003 | Ito | H04M 1/57 |
| | | | 455/517 |
| 2004/0001510 A1* | 1/2004 | Hamilton | 370/466 |
| 2004/0233221 A1* | 11/2004 | Taniguchi | H04M 1/72555 |
| | | | 345/619 |
| 2007/0081643 A1* | 4/2007 | Divine | H04M 1/72527 |
| | | | 379/100.01 |
| 2007/0213052 A1 | 9/2007 | Lim et al. | |
| 2009/0003340 A1* | 1/2009 | Katis | H04L 12/1831 |
| | | | 370/389 |
| 2010/0093315 A1 | 4/2010 | Grosch et al. | |
| 2010/0226485 A1* | 9/2010 | Matsushima | H04M 1/576 |
| | | | 379/142.04 |
| 2010/0322399 A1* | 12/2010 | Couse | H04M 3/42382 |
| | | | 379/93.17 |
| 2012/0076152 A1* | 3/2012 | Mansharamani | G06F 9/546 |
| | | | 370/413 |
| 2012/0117507 A1* | 5/2012 | Tseng | H04M 1/72552 |
| | | | 715/774 |

* cited by examiner

DEVICES FOR MANAGING DATA ASSOCIATED WITH AN AUDIO COMMUNICATION

TECHNICAL FIELD

The present disclosure relates generally to communication systems. More specifically, the present disclosure relates to devices for managing data associated with an audio communication.

BACKGROUND

Electronic devices have become smaller and more powerful in order to meet consumer needs and to improve portability and convenience. Consumers have become dependent upon electronic devices and have come to expect reliable service, expanded areas of coverage and increased functionality.

As electronic devices have advanced, improvements in communication speed, flexibility, functionality and/or efficiency have been sought. However, improving communication flexibility, functionality and/or efficiency may present certain problems.

For example, electronic devices may be equipped to receive data from other electronic devices. In some cases, the data may be processed in the background and may not be displayed on the electronic device. This may result in information being buried under the audio communication interface. As illustrated in this discussion, systems and methods that improve communication flexibility, functionality and/or efficiency may be beneficial.

DETAILED DESCRIPTION

Figure 1:
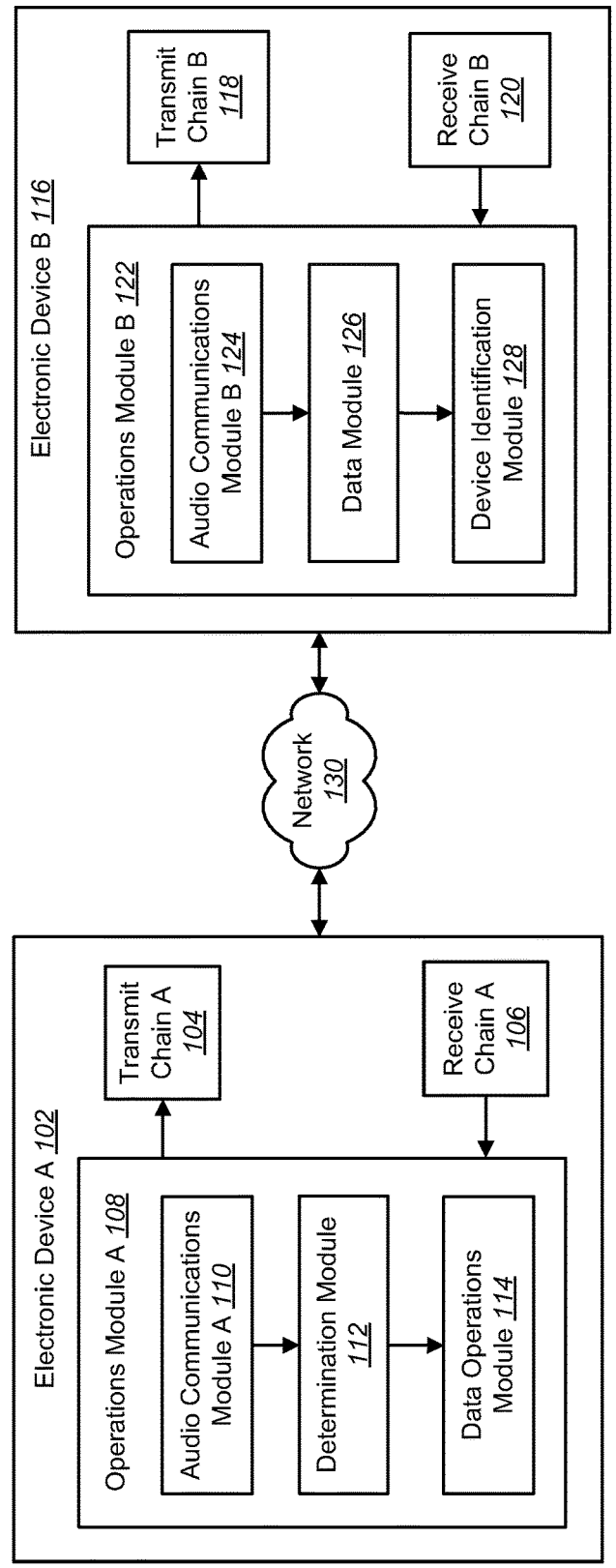
FIG. 1 is a block diagram illustrating one configuration of electronic devices in which systems and methods for managing data associated with an audio communication may be implemented.

An electronic device for managing data associated with an audio communication is described. The electronic device includes a processor and memory in electronic communication with the processor. Executable instructions are stored in the memory. The electronic device establishes an audio communication. The electronic device also receives data. The electronic device further determines whether the data is associated with the audio communication. The electronic device additionally performs an operation based on the data if the data is associated with the audio communication. Determining whether the data is associated with the audio communication may also include identifying a sender of the data and determining whether the sender of the data is associated with the audio communication. Establishing an audio communication may also include sending one or more messages. The electronic device may terminate operations when the audio communication ends.

Performing an operation based on the data may also include displaying information based on the data. The electronic device may not display information based on the data if the data is not associated with the audio communication.

The electronic device may defer performing an operation based on the data if the data is not associated with the audio communication. Performing an operation based on the data may also include prioritizing one or more additional operations based on the data. Performing an operation based on the data may also include determining whether other operations are authorized.

Receiving data may be based on a session initiation protocol. The session initiation protocol may identify a sender of the data. The electronic device may authenticate the sender of the data.

A method for managing data associated with an audio communication by an electronic device is also described. The method includes establishing an audio communication. The method also includes receiving data. The method further includes determining whether the data is associated with the audio communication. The method additionally includes performing an operation based on the data if the data is associated with the audio communication.

An electronic device for sending data is also described. The electronic device includes a processor and memory in electronic communication with the processor. The instructions stored in the memory are executable. The electronic device establishes an audio communication. The electronic device also obtains data associated with the audio communication. The electronic device further identifies a device based on the audio communication. The electronic device additionally sends the data associated with the audio communication to the device.

A method for sending data by an electronic device is also described. The method includes establishing an audio communication. The method also includes obtaining data associated with the audio communication. The method further includes identifying a device based on the audio communication. The method additionally includes sending the data associated with the audio communication to the device.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home eNB (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

Audio communication in wireless communication has been used as a main application in many of the electronic devices in the market. However, it has been used as a standalone application without interacting with other data-centric services, such as web browsing and messaging.

There are many instances in which it would be beneficial to exchange non-voice information from one electronic device to another in association with an audio communication between those electronic devices. For example, retailers could benefit from offering business hours and information on specials in a visual format to customers sharing an audio communication. As an illustration, improved user experience may result if the electronic devices receive and display selection menus from automated phone answering systems. In another example, participants of an audio communication voice call may desire to exchange information about web pages during the conversation. In another example, a user of an electronic device may desire to receive the location of another electronic device (e.g., the person he/she is talking to) and display the location on the electronic device.

In some implementations, an electronic device may concurrently operate one or more of data sessions and messaging during an audio communication. In an example, a first electronic device participating in an audio communication may receive data from a second electronic device which the second electronic device is also participating in the audio communication. In some examples, the second electronic device could be a mobile device, a network server, a personal computer, an internet protocol (IP) telephone or any other type of communication equipment. In some approaches, the data associated with the audio communication may contain a set of instructions to direct the first electronic device to perform an operation, such as displaying a menu system, displaying a map with the location of the second electronic device and launching a certain application. In some cases, the first electronic device may handle the data from the second electronic device in the same manner as data received from any other electronic device. That is, since the audio communication application takes over the foreground of the display, the first electronic device may process the received data in the background but, in certain examples, may not disturb the foreground of the display until the audio communication ends. As a result, the effects of the received data may be buried under the foreground application and the intended services will not be presented to the user during the audio communication.

In some implementations, an electronic device may handle data received from another electronic device participating in an audio communication in a way (distinct from the regular manner of handling data) such that the data and corresponding information are presented on a display of the electronic device in a pre-emptive and emphasized manner. In this implementation, the electronic device may recognize an association of the received data to the audio communication, process the data associated with the audio communication, and provide the services that the data is intended to offer. In some implementations, the services may be presented on the foreground of the display.

One example of the systems and methods disclosed herein is given as follows. In this example, an electronic device (e.g., a wireless communication device) and an automated answering system may be pre-registered to an IP Multimedia Subsystem (IMS) network. In some implementations, this pre-registration may include obtaining an IMS address that identifies the electronic device. Using an audio communication application loaded on the electronic device, a user may initiate a voice call to a business entity that operates the automated answering system. In this example, the electronic device may send an invite message to the automated answering system. In some implementations, this message may be based on a session initiation protocol (SIP) and the electronic device may send the message via an SIP proxy. The invite message may indicate a calling party address (e.g., a "from:" field) which may be based on the electronic device, and a called party address (e.g., a "to:" field) which may pertain to the automated answering system (e.g., the automated answering system phone number). The automated answering system may then send back several messages to establish an audio communication. Similar to the above message, these messages may be based on the SIP and sent via the SIP proxy. The messages from the automated answer machine may indicate the state of the call, indicate session progress and indicate a ring. In some cases, an "OK" message may indicate that the automated answering system has picked up the audio communication. In some implementations, the electronic device may respond with an acknowledge (ACK) message, after which an audio communication may be established.

During the audio communication, the automated answering system may send a message with a destination address (e.g., "to:" field) pertaining to the electronic device and a source address (e.g., "from:" field) pertaining to the automated answering system. In this example, the message may contain data encoded in a markup language (e.g., HyperText Markup Language (HTML) and Extensible Markup Language (XML)). In one example, the data may represent a set of instructions to display a user-selectable menu. The data may also represent descriptions for expected behavior upon the user selecting one of the options (e.g., such as sending a dual-tone multi-frequency (DTMF) tone). An example of encoded data that represents a menu system is given in Listing (1). In an example, the message represented by Listing (1) may be delivered to the electronic device via the SIP proxy.

Listing (1)

MESSAGE sip:+18001234567@xyz.com SIP/2.0
To: A <sip:+13607654321@abs.com>
From: B <sip:+18001234567@xyz.com>
Subject: Menu
Content-type: text/plain
    <?xml version="1.0>
    <menu>
    <option 1>
    <label>1. Order Status</label>
    <action> DTMF_1</action>
    </option 1>
    <option 2>
    <label>2. Specials</label>
    <action> DTMF_2</action>
    </option 2>
    <option 3>
    <label>3. Technical Support</label>
    <action> DTMF_3</action>
    </option 3>
    <option 4>
    <label>0. Operator</label>
    <action> DTMF_0</action>
    </option 4>
    </menu>

Upon receipt of the message, the electronic device may examine the source address (e.g., "to:" field). If the source address is the same as the called party address of the audio communication, the electronic device may associate the message with the audio communication, process the data and display the menu system on top of the audio communication application. In some implementations, when a user of the electronic device selects one of the menu options (e.g., by an input method, such as a touch panel), the electronic device may execute the expected behavior associated with the selected option as described in the message.

It should be noted that during the audio communication, the electronic device may receive messages from other sources. In some examples, because the source address is different from the called party address, these messages may not be associated with the audio communication. In these examples, upon receiving such a message, the electronic device may store the message in a non-volatile memory and may process it after the audio communication has terminated. Alternatively or additionally, the electronic device may perform an operation based on the message in the background but may not present the effects of the message during the audio communication.

Another example of the systems and methods disclosed herein is given as follows. In this example, a first electronic device (e.g., a first wireless communication device) may be participating in an audio communication with a second electronic device (e.g., a second wireless communication device). In some examples this may be done via an IMS network. Similar to described above, the first electronic device may initiate an audio communication and an audio communication may be established between the electronic devices.

In this example, a user of the second electronic device may desire to share his or her location with a user of the first electronic device, for example using a location fix module, such as a GPS receiver. In this example, the second electronic device may include an application that allows the second electronic device to perform a location fix, generate data pertaining to the fixed location, generate a set of instructions for recipients of the data and send the data to the first electronic device (e.g., via a message). In some implementations, the user of the second electronic device may manually select or enter the address of the first electronic device as a destination address of the message. Alternatively, an application program may offer to load the destination address of the message with the addresses of the participants of the audio communication. The second electronic device may then send the message to the first electronic device. The message may be sent according to the method described above.

In this example, the first electronic device, upon receipt of the message, may determine if the message is associated with the audio communication and process the data on the message. The instructions included in the received data may request the first electronic device to display the location of the second electronic device, which location may also be included in the data. In such a case, a map application loaded on the first electronic device may be displayed on the foreground application and display the location of the second electronic device on a map. In some implementations, the first electronic device may elicit permission to launch the map application (e.g., by displaying a pop-up menu with an "OK" button).

Another example of the systems and methods disclosed herein is given as follows. In this example, a second electronic device (e.g., a customer service person of a business entity) uses multiple devices (e.g., an IP phone and a computer), each of which has a unique IMS address, to send data. In some examples, a first electronic device (e.g., a wireless communication device) initiates an audio communication with a second audio electronic device (e.g., the IP phone). Similar to earlier examples, after an audio communication has been established, the second electronic device may send a message containing data. In some implementations, this data may include instructions to display business information (e.g., such as hours and specials) on the first electronic device. In some cases, a second data electronic device (e.g., the computer) may be the source of the data. In this case, the source address of the message (e.g., identifying of the computer) is different from the called party address of the audio communication (e.g., identifying the IP phone). In this case, the data sent via the message may indicate an association between the second audio electronic device (e.g., the IP phone) and the second data electronic device (e.g., the computer). For example, the second data electronic device (e.g., the computer) may be pre-configured with the called party address of the second audio electronic device (e.g., the IP phone). In one implementation, a user of the second audio electronic device may enter his IP phone number into the second data electronic device. Additionally or alternatively, the second data electronic device may be linked (via a wired or wireless link such as Ethernet, Universal Serial Bus (USB), Bluetooth, etc.) to the second audio electronic device. In this example, the second audio electronic device may send a phone number pertaining to the second audio electronic device to the second data electronic device. In this example, in addition to the data, the message may include information indicating the association. When the first electronic device receives the message, it may parse this information indicating the association to determine the association and process the data accordingly. An example of encoded data that includes information indicating the association is given in Listing (2).

Listing (2)

MESSAGE sip:customer_service@xyz.com SIP/2.0
To: A <sip:+13607654321@abs.com>
From: C <sip:customer_service@xyz.com>
Subject: Menu
Content-type: text/plain
    <?xml version="1.0>
    <association> sip:+18001234567@xyz.com</association>
    <document>
    <p> Business Hour 10AM-6PM </p>
    <p> Today's Special
    ...
    </p>
    </document>

While the above described examples illustrate use of an IMS network with the SIP protocols, it should be noted that the systems and methods disclosed herein may be implemented with other types of networks, such as third generation (3G) cellular networks. Using a 3G cellular network, messages may be received during a circuit switched audio communication. In this example, the electronic device may match the source address of the received message with the phone number of a participant in the audio communication to identify the association.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed but is merely representative of the systems and methods.

FIG. 1 is a block diagram illustrating one configuration of electronic devices 102, 116 in which systems and methods for managing data associated with an audio communication may be implemented. Examples of electronic devices 102, 116 include cellular phones, smart phones, personal digital assistants (PDAs), network servers, IP phones, tablet devices, gaming systems, laptop computers, desktop computers, netbooks, e-readers, wireless modems and other electronic devices. It should be noted that while FIG. 1 depicts two electronic devices 102, 116, the systems and methods disclosed herein may be applied to any number of electronic devices 102, 116. For example, multiple electronic devices A 102 may communicate with electronic device B 116.

In some implementations, electronic device A 102 may include one or more of operations module A 108, transmit chain A 104 and receive chain A 106. As used herein, the term "module" may indicate that a particular element or component may be implemented in hardware, software, firmware or a combination thereof. For example, operations module A 108 may be implemented in hardware (e.g., circuitry), software (e.g., instructions that are executable by a processor) or a combination of both.

Transmit chain A 104 may prepare signals (e.g., data and control information) for transmission. For example, transmit chain A 104 may prepare signals for one or more of wired and wireless transmission. For instance, transmit chain A 104 may prepare control information supplied by operations module A 108 and provide it to one or more antennas (not shown) for transmission. Transmit chain A 104 may include one or more modules that enable electronic device A 102 to transmit signals (e.g., data and control information). In some implementations, for example, transmit chain A 104 may include one or more encoders, one or more scrambling modules, one or more modulation mappers, one or more interleavers, a layer mapper, a pre-coding module, one or more resource element mappers and one or more Orthogonal Frequency-Division Multiplexing (OFDM) signal generation modules.

For instance, transmit chain A 104 may format and transmit signals that include data and control information. For example, transmit chain A 104 may scramble, encode, interleave, modulate, map (to spatial streams or layers), precode, upconvert, filter and amplify (or otherwise format) data and control information for transmission. It should be noted that multiple instance of transmit chain A 104 may be included in the electronic device 102 in some configurations.

Receive chain A 106 may receive signals. For example, receive chain A 106 may receive, detect and de-format data and control information from one or more antennas (not shown). Receive chain A 106 may include one or more modules that enable electronic device A 102 to receive signals (e.g., data and control information). In some implementations, for example, receive chain A 106 may include a receive signal detector, one or more demodulators, one or more decoders, one or more deinterleavers and one or more descramblers.

For instance, receive chain A 106 may receive and de-format signals that include data and control information. Receive chain A 106 may amplify, downconvert, detect, demodulate, decode, filter and descramble (or otherwise de-format) received signals to produce received data and control information. Received control information may be provided to operations module A 108. It should be noted that multiple instances of receive chain A 106 may be included in electronic device A 102 in some configurations.

Operations module A 108 may enable electronic device A 102 to allocate resources for managing data associated with an audio communication. For example, operations module A 108 may include audio communications module A 110.

Audio communications module A 110 may establish an audio communication between electronic device A 102 and another electronic device (e.g., electronic device B 116). In some implementations, the audio communication may be a voice communication (e.g., voice call) between electronic device A 102 and electronic device B 116 (e.g., between the users of electronic device A 102 and electronic device B 116). In other implementations, the audio communication may be based on a pre-recorded audio communication (e.g., between a user of electronic device A 102 and an automated electronic device B 116).

In some implementations, audio communications module A 110 may establish the audio communication by sending one or more messages. For example, audio communications module A 110 may send an invite message to electronic device B 116. This invite message may request an audio communication link with electronic device B 116. In some cases, the invite message may include a called party address identifying electronic device B 116 as the recipient of the message. The invite message may also include a calling party address indicating electronic device A 102 as the party requesting audio communication. In some implementations, the called party address and the calling party address may include an IMS address that identifies electronic device A 102 and electronic device B 116 as pertaining to an IMS network. Audio communications module A 110 may also receive messages from electronic device B 116 based on the invite message. For example, audio communications module A 110 may receive one or more messages that establish an audio communication. For example, communications module A 110 may receive a response message indicating that electronic device B 116 may comply with the request to establish audio communication. Additionally, audio communications module A 110 may receive other messages indicating the status of the audio communication (e.g., a status message indicating the status of the audio communication or a progress message indicating the progress on establishing the audio communication). In some implementations, communications module A 110 may send an ACK message indicating receipt of the one or more messages. In other implementations, audio communications module A 110 may send one or more messages that establish an audio communication. Audio communications module A 110 may send the one or more messages in response to an invite message from electronic device B 116.

In some implementations, audio communications module A 110 may send the one or more messages based on the SIP. For example, audio communications module A 110 may transmit HTML messages with electronic device B 116 to establish the audio communication. In certain examples, audio communications module A 110 may transmit the one or more messages through an intermediary electronic device (e.g., an SIP proxy). In this example, the SIP proxy may receive a message sent by communications module A 110 and transmit at least a portion of the message onto electronic device B 116. In certain examples, the intermediary electronic device (e.g., SIP proxy) may enforce policies of the protocol and rewrite at least a portion of the message before transmitting the message on to electronic device B 116.

Operations module A 104 may also include a determination module 112. Upon receipt of data from electronic device B 116, the determination module 112 may determine whether the data received is associated with the audio communication. As will be described in greater detail, determining whether the data is associated with the audio communication may be beneficial as it may permit organization of data received by electronic device A 102. Furthermore, this may be beneficial in that electronic device A 102 may perform operations based on data that is associated with the audio communication while deferring performing operations based on data that is not associated with the audio communication.

The determination module 112 may identify the sender of the data. In some implementations, the determination module 112 may identify the sender based on information contained in the data. For example, data sent by electronic device B 116 may include a source address. Upon receipt, the determination module 112 may examine the source address to identify the sender of the data. In some configurations, the source address may include a phone number. Other examples of ways to identify the sender of the data include, but are not limited to, IMS address, username, biometric information, IP address, Media Access Control (MAC) address and device name verification. In some implementations, the determination module 112 may independently identify the sender. For example, the determination module 112 may receive the data to identify electronic device B 116 as the sender of the data. In some implementations, the determination module 112 may not require any intermediary electronic devices to identify the sender. For example, the determination module 112 may not access a remote database to identify the sender in some configurations. Rather, the determination may be based only on information received from the sender in some configurations.

In some implementations, the determination module 112 may also determine whether the sender of the data is associated with the audio communication. As will be described in greater detail below, if the sender of the data is associated with the audio communication, then electronic device A 102 may perform one or more operations based on the data.

In some cases, the sender of the data may be associated with the audio communication if the sender of the data is a participant in the audio communication. Thus, the determination module 112 may determine whether the data is associated with the audio communication by determining whether the sender is a participant in the audio communication. For example, the determination module 112 may identify the sender of the data (e.g., by examining the source address of the received data). The determination module 112 may also identify participants in the audio communication (e.g., by examining the called party address of the audio communication). If both identities (e.g., the source address and the called party address) pertain to the same electronic device, the determination module 112 may determine that the sender of the data is a participant in the audio communication. As described above, if the sender of the data is a participant in the audio communication, the determination module may determine that the received data is associated with the audio communication (e.g., by virtue of being sent by a participant in the audio communication). For example, the determination module 112 may determine whether the source address of the received data indicates electronic device B 116. The determination module 112 may also determine whether the called party address indicates electronic device B 116 as a participant in the audio communication. If both the source address and the called party address pertain to electronic device B 116, the determination module 112 may determine that the received data (from electronic device B 116) is associated with the audio communication. In some implementations, the determination module 112 may determine whether the sender of the data is a participant in the audio communication independently. For example, the determination module 112 may not require any intermediary electronic devices to determine whether the sender of the data is a participant in the audio communication. For instance, the determination module 112 may not access a remote database to determine whether the sender of the data is a participant in the audio communication. Rather, the determination may be based only on information received from the sender in some configurations.

In other cases, the sender of the data may be associated with the audio communication if the sender of the data is associated with a participant in the audio communication. Thus, the determination module 112 may determine whether the data is associated with the audio communication by determining whether the sender is associated with a participant in the audio communication. For example, the determination module 112 may identify the sender of the data (e.g., by examining the source address). The determination module 112 may also identify a participant in the audio communication (e.g., by examining the called party address). If the two identities (e.g., the source address and the called party address) are associated, the determination module 112 may determine that the received data is associated with the audio communication. For example, the determination module 112 may determine that the called party address indicates electronic device B 116 (e.g., a company customer service IP phone) as a participant in the audio communication. The determination module 112 may also determine that the source address indicates another electronic device (e.g., a company server). In this example, the determination module 112 may associate the called party address (indicating electronic device B 116) with the source address (indicating the other electronic device). If the called party address and the source address are associated, the determination module 112 may determine that the received data (from the other electronic device) is associated with the audio communication to electronic device B 116. In some implementations, the determination module 112 may independently determine whether the sender of the data is associated with a participant in the audio communication. For example, the determination module 112 may not require any intermediary electronic device to determine whether the sender of the data is associated with a participant in the audio communication.

In some implementations, the determination module 112 may determine the association based on information contained in the received data. For example, the data may include an indication of the association between the sender of the data and the participant in the audio communication. Drawing from the above example, the source address indicating the other electronic device (e.g., the company server) may identify an association with the called party address indicating electronic device B 116 (e.g., the company customer service representative). An example of a message indicating an association is given in Listing (2). In Listing (2) the source address (e.g., the "From:" field) identifies the sender of the data (e.g., customer_service@xyz.com). The association tag of Listing (2) indicates the association between the sender of the data and the called party (e.g., 180001234567@xyz.com).

The data operations module 114 may perform operations based on the data. For example, the data operations module 114 may perform operations based on the data if the data is associated with the audio communication. In this example, the operations module 114 may perform an operation based on instructions contained within the data. In one example, the operations module 114 may display information to a display in communication with electronic device A 102 based on instructions contained in the data. Other examples of operations that may be performed based on the data include, but are not limited to, displaying a map on the display in communication with electronic device A 102, retrieving information from electronic device A 102 and launching an application on electronic device A 102.

In some configurations, the data operations module 114 may perform operations based on the data according to established procedures. For example, the data may include an image or text to display. In this example, the data operations module 114 may receive the data and process the data (e.g., image, text) based on procedures contained within the data operations module 114. For instance, the data operations module 114 may utilize a default program to display a received image, to output audio, to present video, etc.

In some implementations, the data operations module 114 may prioritize the operations based on the data (over other operations of electronic device A 102, for instance). For example, if the data is associated with the audio communication, the data operations module 114 may display information based on the data. In some implementations, displaying information based on the data associated with the audio communication may preempt the display of other information (e.g., call information, data not associated with the audio communication, text messages not associated with the audio communication, etc.) of electronic device A 102.

In other examples, prioritizing the operations of electronic device A 102 may include performing operations based on the data associated with the audio communication first. For example, if data associated with the audio communication directs electronic device A 102 to launch an application, this request may take priority over another request to launch a different application (e.g., based on data not associated with the audio communication).

In some implementations, the data operations module 114 may allocate resources of electronic device A 102 to perform operations based on the data. For example, the data operations module 114 may allocate a greater part of the display (included in or in communication with electronic device A 102, for example) to display information based on data associated with the audio communication. In this example, the data operations module 114 may allocate a lesser part of the display to display information based on data that is not associated with the audio communication (e.g., indicating that data not associated with the audio communication has been received). In another example, electronic device A 102 may dedicate a larger share of processing to the operation based on the data associated with the audio communication. For instance, operations based on non-associated data may be allocated a smaller share of processing and may be run in the background.

In some implementations, the data operations module 114 may determine whether electronic device A 102 is authorized to perform one or more additional operations. The one or more additional operations may be based on the data associated with the audio communication. For example, the data operations module 114 may elicit input of authorization from a user of electronic device A 102 before performing one or more operations contained in the received data. More particularly, the data operations module 114 may elicit permission (e.g., a display with an "OK" button) before launching an application. Other examples of ways to determine authorization include, but are not limited to, authenticating the sender of the data, authenticating the received data and password input.

Additionally or alternatively, the data operations module 114 may defer performing operations based on the data if the data is not associated with the audio communication. For example, the data operations module 114 may defer displaying information based on data not associated with the audio communication until the operations based on data associated with the audio communication have been performed. In these examples, the data operations module 114 may store the data not associated with the audio communication in a non-volatile memory location (not shown) in communication with electronic device A 102.

Performing operations based on the data may be beneficial as it may allow exchange of associated (non-voice) information between electronic devices 102, 116 engaged in audio communication. For example, participants in audio communication may share their respective location based on location fix modules (e.g., GPS receivers) contained in their respective electronic devices.

Electronic device A 102 may communicate with electronic device B 116. Electronic device B 116 may include one or more of operations module B 122, transmit chain B 118 and receive chain B 120 similar to operations module A 108, transmit chain A 104 and receive chain A 106 described previously. Electronic device B 116 may communicate with electronic device A 102 through a network 130. Examples of a network 130 include personal area networks, local area networks (LAN), wide area networks (WAN), cellular networks, satellite networks and any other type of network.

Operations module B 122 may enable electronic device B 116 to allocate resources for sending data. For example, operations module B 122 may include audio communications module B 124, similar to audio communications module A 110 described in connection with electronic device A 102. As similarly described in connection with audio communications module A 110, audio communications module B 124 may establish an audio communication between electronic device B 116 and another electronic device (e.g., electronic device A 102).

In some implementations, audio communications module B 124 may establish the audio communication by sending one or more messages. For example, this may be done as described in connection with audio communications module A 110.

In some implementations, the data module 126 may obtain data associated with an audio communication. In some cases, the data associated with the audio communication may originate from electronic device B 116. For example, data indicating the geographic location of electronic device B 116 may be provided by a locating module (not shown) included in electronic device B 116. In other cases, the data may be located on another electronic device in communication with electronic device B 116. For example, data containing instructions that request electronic device A 102 to perform an operation may be located on the other electronic device. For instance, the data module 126 may obtain the data originating from the other electronic device. In another instance, the data module 126 may reference the location of the data on the other electronic device. Accordingly, rather than sending the data to electronic device A 102, the data module 126 may direct the other electronic device to send the data to electronic device A 102. In some implementations, the data may include instructions that request a recipient device to perform an operation. For example, the data may instruct electronic device A 102 to display information based on the data. The data may also include information identifying the source of the data (e.g., the source address) and the recipient of the data (e.g., a "To:" field).

The device identification module 128 may obtain information that identifies electronic device A 102. In some implementations, the device identification module 128 may identify the device based on information received while establishing an audio communication. For example, the invite message from electronic device A 102 may identify a participant in the audio communication (with a calling party address, for example). For instance, the invite message from electronic device A 102 may include a phone number corresponding to electronic device A 102. Upon receipt, the device identification module 128 may identify a participant in the audio communication (by examining the calling party address, for instance). Other examples of ways to identify electronic device A 102 include, but are not limited to, IMS address, username, biometric information, IP address, MAC address and device name verification. In some implementations, the device identification module 128 may independently obtain information that identifies electronic device A 102. For example, the device identification module 128 may not access a remote database to identify the sender (e.g., participant) in some configurations. Rather, the identification may be based only on information received from the sender in some configurations.

It should be noted that one or more of the elements or parts thereof included in the electronic devices 102, 116 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
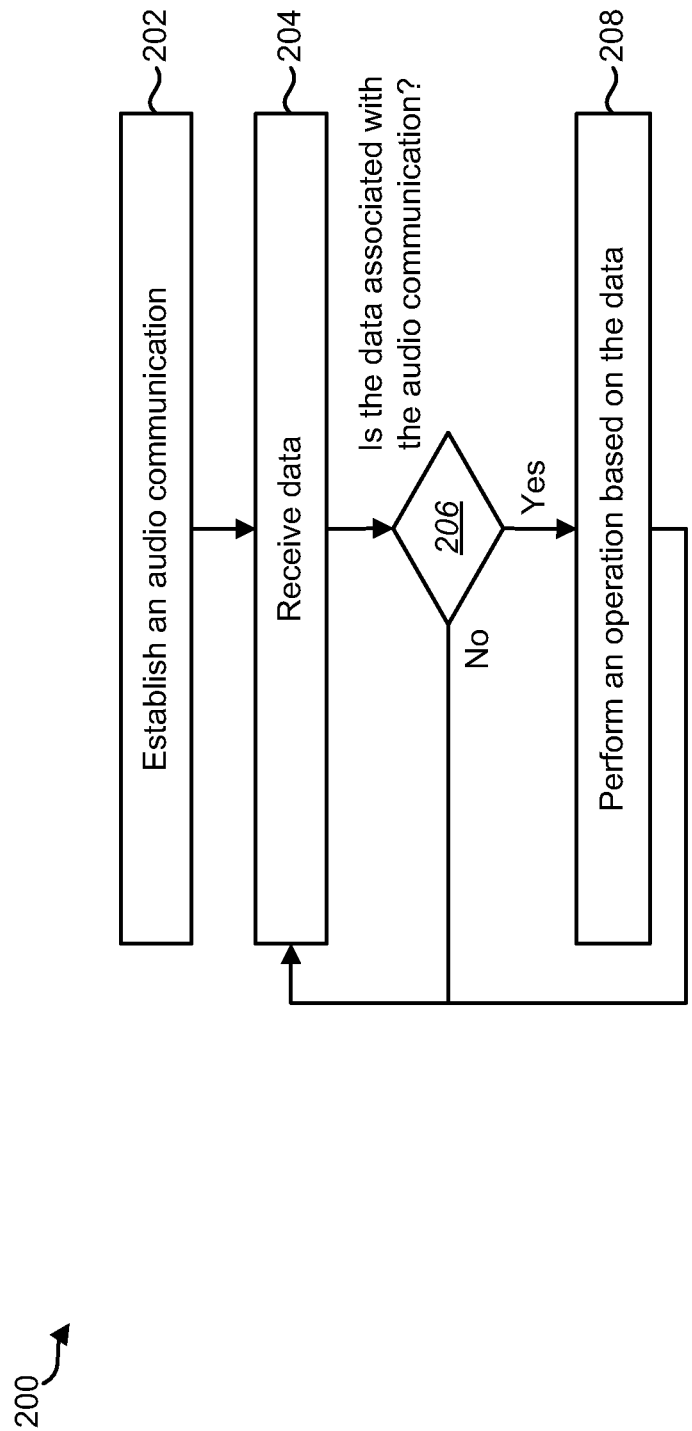
FIG. 2 is a flow diagram illustrating one configuration of a method for managing data associated with an audio communication by an electronic device.

FIG. 2 is a flow diagram illustrating one configuration of a method 200 for managing data associated with an audio communication. The electronic devices 102, 116 may establish 202 an audio communication. For example, the audio communication may be established by sending one or more messages. For instance, electronic device A 102 may send an invite message to electronic device B 116. The invite message may invite electronic device B 116 to establish an audio communication with electronic device A 102. In response, electronic device A 102 may receive one or more messages to establish an audio communication. For example, electronic device A 102 may receive a response message indicating that electronic device B 116 may comply with the invitation to establish an audio communication. In some implementations, electronic device A 102 may send an ACK message indicating that the response message has been received. It should be noted that other messages may be transmitted or received to establish an audio communication. For example, electronic device A 102 may receive status messages indicating the status of the audio communication.

In other implementations, electronic device B 116 may send the invite message to electronic device A 102. In response, electronic device B 116 may receive one or more messages from electronic device A 102. Electronic device B 116 may then send an ACK message indicating that the response message has been received.

In some implementations, the one or more messages may be sent according to the SIP. For example, the electronic devices 102, 116 may communicate via an SIP proxy that receives messages from one electronic device (e.g., electronic device A 102) and transmits them to another electronic device (e.g., electronic device B 116). The SIP proxy may perform additional operations to the messages (e.g., syntax correction, authenticate a sender and the recipient of the one or more messages).

Electronic device A 102 may receive 204 data. In some configurations or instances, electronic device A 102 may receive 204 data that contains instructions that direct electronic device A 102 to perform an operation. For example, the data may include instructions directing electronic device A 102 to display information based on the data. Other examples of instructions that may be included in the data include instructions for displaying a menu, displaying a map, retrieving information from electronic device A 102 and launching an application on electronic device A 102.

The data may also include one or more of descriptions for expected behavior of electronic device A 102. The data may also include operations to be performed based on the execution of the expected behavior. For example, the data may direct electronic device A 102 to display a menu. The data may also include instructions on operations to perform as a user of electronic device A 102 selects an option from the menu. For example, if a user selects an option from a menu to launch a particular application, the data may include instructions directing electronic device A 102 to launch the particular application.

In some implementations, the data may include information that identifies the sender of the data (e.g., a source address). In the event that the sender of the data is not the same as the participant in the audio communication, the data may include information associating the sender of the data with the participant in the audio communication.

Electronic device A 102 may determine 206 if the data is associated with the audio communication. In some implementations, electronic device A 102 may identify the sender of the data. This may be done based on information contained in the data. For example, in some implementations, the data may include a source address that identifies the sender of the data. In this implementation, electronic device A 102 may examine the source address (e.g., phone number) to identify the sender of the data. In other implementations, electronic device A 102 may identify the sender of the data using one or more of sender username, biometric information, IMS address, IP address, MAC address and device name.

In some implementations, electronic device A 102 may determine 206 if the data is associated with the audio communication by determining whether the sender of the data is a participant in the audio communication. If the sender of the data is a participant in the audio communication, then electronic device A 102 may determine that the data is associated with the audio communication. By comparison, if the sender of the data is not a participant in the audio communication, then electronic device A 102 may determine that the data is not associated with the audio communication. In some implementations, electronic device A 102 may determine whether the sender of the data is a participant in the audio communication by comparing the identity of the sender of the data (e.g., the source address) with the identity of the participant in the audio communication (e.g., the called party address). If the identities are the same (e.g., if a phone number corresponding to the data is the same as a phone number corresponding to the audio communication), electronic device A 102 may determine that the sender of the data is a participant in the audio communication.

In other implementations, electronic device A 102 may determine 206 if the data is associated with the audio communication by determining whether the sender of the data is associated with a participant in the audio communication. If the sender of the data is associated with a participant in the audio communication, then electronic device A 102 may determine that the data is associated with the audio communication. By comparison, if the sender of the data is not associated with a participant in the audio communication, then electronic device A 102 may determine that the data is not associated with the audio communication. In some implementations, electronic device A 102 may determine whether the sender of the data is associated with a participant in the audio communication by comparing the identity of the sender of the data (e.g., the source address) with the identity of the participant in the audio communication (e.g., the called party address). If the identifies are different, electronic device A 102 may determine if there is an association between sender of the data and the participant in the audio communication. In some implementations, the data may indicate this association. An example of data that indicates an association is given in Listing (2).

In some implementations, electronic device A 102 may determine 206 whether the data is associated with the audio communication independently. For example, electronic device A 102 may not require any intermediary electronic devices to determine whether the data is associated with the audio communication. For instance, electronic device A 102 may not access a remote database to determine whether the sender of the data is a participant or is associated with a participant in the audio communication. Rather, the determination may be based only on information received from the sender in some configurations.

If the data is associated with the audio communication, electronic device A 102 may perform 208 an operation based on the data. In some implementations, the data may include instructions that direct electronic device A 102 to perform an operation. For example, the instructions may direct electronic device A 102 to display information based on the information on a display in communication with electronic device A 102. In this example, electronic device A 102 may execute the instructions contained in the data. Other examples of operations that may be performed include displaying a map, retrieving information and launching an application.

In some configurations, the operation that is performed may include determining whether other operations may be performed. For example, the data may include instructions directing electronic device A 102 to elicit a response from the user authorizing other operations to be performed. In some implementations, the other operations may be based on the data.

In some implementations, the electronic device may prioritize the operations of electronic device A 102. For example, electronic device A 102 may perform operations based on data associated with the audio communication before performing operations based on data not associated with the audio communication.

In some implementations, the operation that is performed may prioritize the operations of electronic device A 102. For example, the data may include instructions allocating the resources of electronic device A 102. In some implementations, the instructions may allocate a greater part of the resources of electronic device A 102 to perform functions based on the data associated with the audio communication. For example, the instructions may instruct electronic device A 102 to display information based on the data associated with the audio communication before displaying information based on the data that is not associated with the audio communication. In this example, the data may also include instructions that allocate a lesser portion of the display to display information based on the data that is not associated with the audio communication (e.g., indicating that data not associated with the audio communication has been received).

In some implementations, after performing 208 an operation based on the data, electronic device A 102 may return to receive 204 data. Similarly, if the data is not associated with the audio communication, electronic device A 102 may return to receive 204 data associated with the audio communication. In some implementations, operations may continue in accordance with the method until the audio communication ends. In some implementations, operations may be terminated when the audio communication ends. For example, electronic device A 102 may discontinue performing one or more functions, procedures, operations, the method 200, etc., when an audio communication ends.

Figure 3:
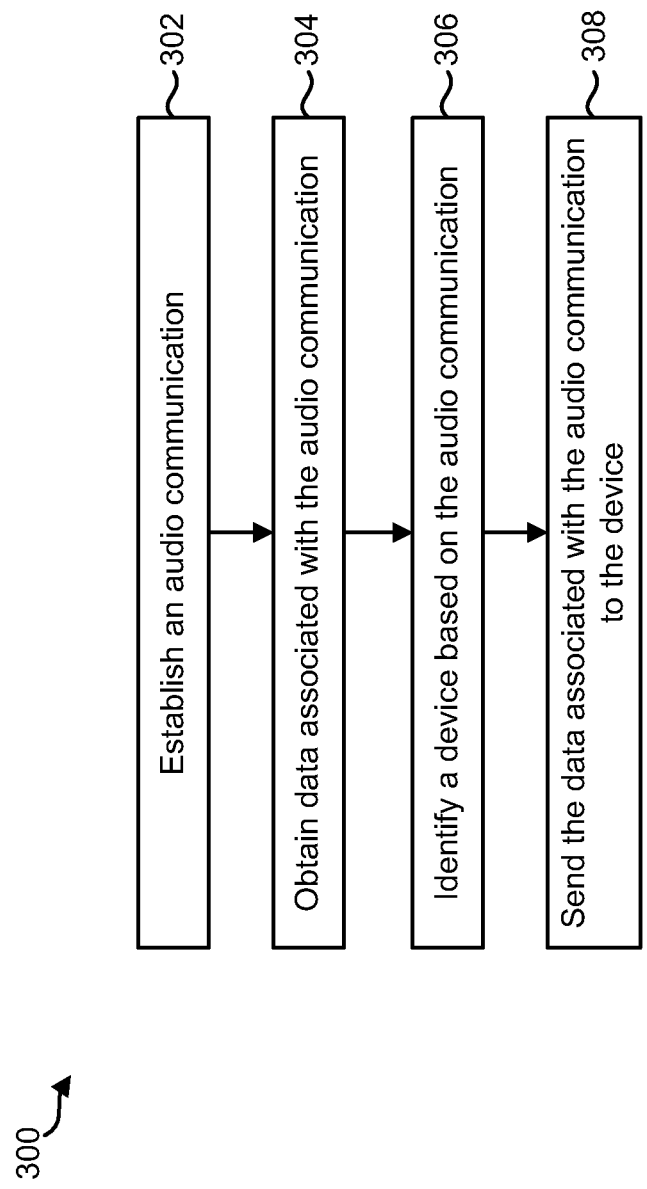
FIG. 3 is a flow diagram illustrating one configuration of a method for sending data associated with an audio communication by an electronic device.

FIG. 3 is a flow diagram illustrating one configuration of a method 300 for sending data associated with the audio communication. In some implementations, the electronic devices 102, 116 may establish 302 an audio communication similarly as described in connection with FIG. 2.

Electronic device B 116 may obtain 304 data associated with the audio communication. In some implementations, the data may include instructions requesting a recipient to perform an operation. For example, the data may instruct electronic device A 102 to display information based on the data. In some cases, the data associated with the audio communication may be located on electronic device B 116. For example, data indicating the geographic location of electronic device B 116 may be located on a locating module (not shown) of electronic device B 116. In other cases, the data may be located on another electronic device in communication with electronic device B 116. For example, data containing instructions requesting electronic device A 102 to perform an operation may be located on the other electronic device. In an example under this case, the data module 126 may obtain the data located on the other electronic device. In another example under this case the data module 126 may reference the location of the data on the other electronic device.

Electronic device B 116 may identify 306 a device based on the audio communication. In some implementations, electronic device B 116 may identify 306 a device based on information obtained while establishing an audio communication. For example, electronic device B 116 may receive an invite message from electronic device A 102 inviting electronic device B 116 to establish an audio communication. In this example, the invite message may include an identification of the device that sent the message (e.g., a calling party address). In one implementation, electronic device B 116 may examine the invite message to identify the sender of the message (e.g., by examining the calling party address). In some configurations, the source address may include a phone number. Other examples of ways to identify 306 a device include, but are not limited to identifying: IMS address, username, biometric information, IP address, MAC address and device name. In some implementations, electronic device B 116 may independently identify 306 a device based on the audio communication.

Electronic device B 116 may send 308 the data associated with the audio communication to the device. In some implementations, electronic device B 116 may send 308 the data via the network 130.

In some implementations, electronic device B 116 may direct another electronic device to send the data to electronic device A 102. For example, in the case where the data is located on another electronic device, electronic device B 116 may direct the other electronic device to send the data to electronic device A 102. In this example, sending 308 the data may include identifying an association between the other electronic device and electronic device B 116.

Figure 4:
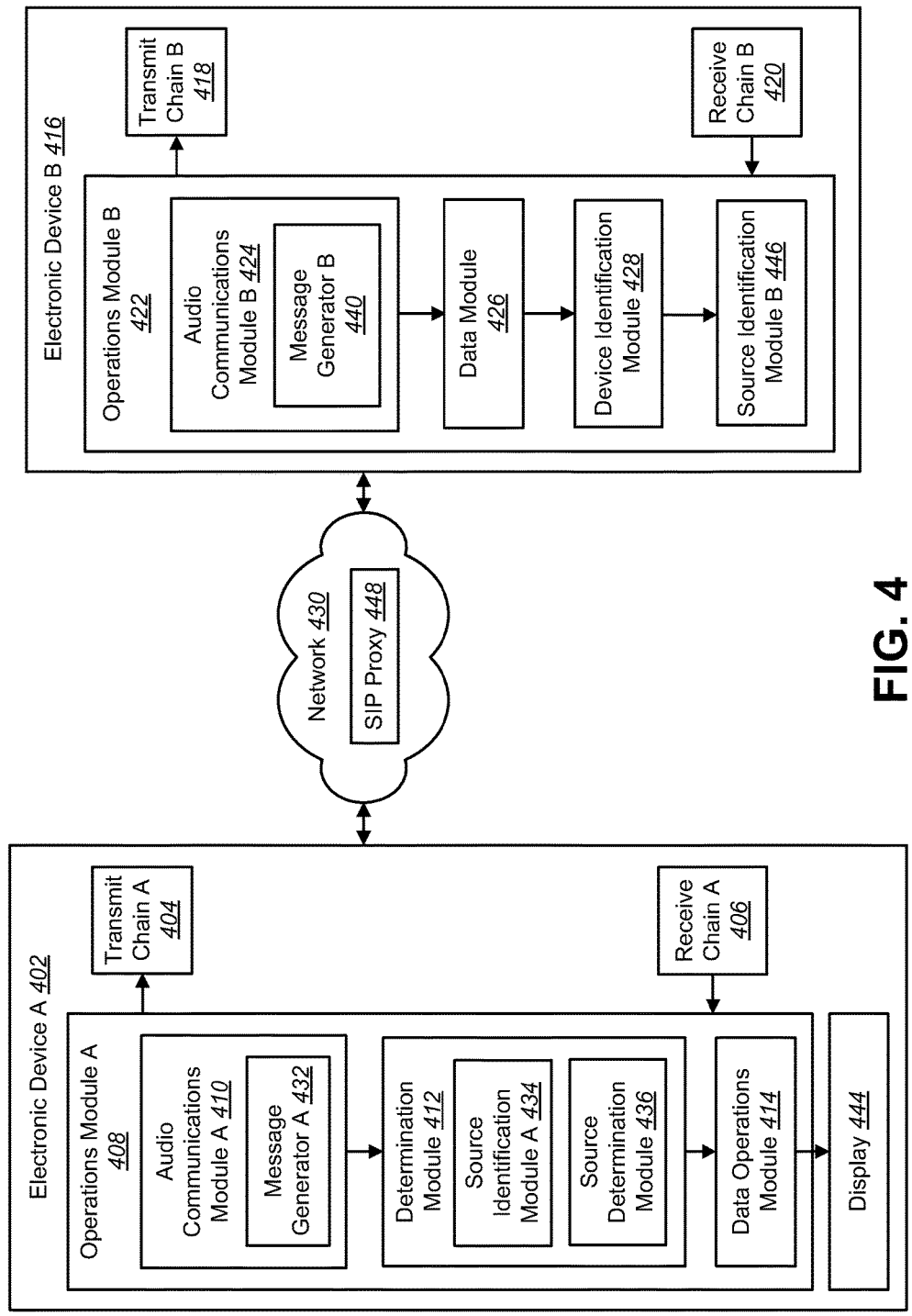
FIG. 4 is a block diagram illustrating another configuration of electronic devices in which systems and methods for managing data associated with an audio communication may be implemented.

FIG. 4 is a block diagram illustrating another configuration of electronic devices 402, 416 in which systems and methods for managing data associated with an audio communication may be implemented. Examples of electronic devices 402, 416 include, cellular phones, smart phones, personal digital assistants (PDAs), network server, IP phone, tablet devices, gaming systems, laptop computers, netbooks, e-readers, wireless modems and any other electronic device. It should be noted that while FIG. 4 depicts two electronic devices 402, 416, the systems and methods disclosed herein may be applied to any number of electronic devices 402, 416. For example, in one implementation, multiple instances of electronic device A 402 may communicate with electronic device B 416.

In some implementations, electronic device A 402 may include one or more of operations module A 408, transmit chain A 404 and receive chain A 406 similar to corresponding elements described above in connection with FIG. 1. In some implementations, operations module A 408 may include one or more of audio communications module A 410, a determination module 412 and a data operations module 414 similar to corresponding elements described in connection with FIG. 1.

In some implementations, audio communications module A 410 may include message generator A 432. In some implementations, message generator A 432 generates the one or more messages to establish an audio communication. For example, message generator A 432 may generate an invite message requesting electronic device B 416 to join in an audio communication. Message generator A 432 may also generate an ACK message indicating that a response message has been received. Message generator A 432 may also reply to an invite message received from electronic device B 416. In some implementations, message generator A 432 may reply by sending one or more messages. In some implementations, message generator A 432 may send and receive other messages pertaining to the status of the audio communication. For example, message generator A 432 may send an ACK message indicating that data has been received. In some implementations, message generator A 432 may generate messages based on the SIP. In this example, an SIP proxy 448 may receive the message sent by audio communications module A 410 and transmit at least a portion of the message onto electronic device B 416. In certain examples, the SIP proxy 448 may enforce policies of the protocol and rewrite at least a portion of the message before transmitting the message on to electronic device B 416.

In some examples, source identification module A 434 may identify the sender of the data. In some implementations, source identification module A 434 may identify the sender based on information contained in the data. For example, a sender (e.g., electronic device B 116) may be identified in the data by a source address. Upon receipt, source identification module A 434 may examine the source address to identify the sender of the data. In some configurations, the source address may include a phone number. Other examples of ways to identify the sender of the data include, but are not limited to, IMS address, username, biometric information, IP address, MAC address and device name verification. In some implementations, the source determination module 436 may independently determine that electronic device B 416 is associated with the audio communication.

A source determination module 436 may determine whether the sender of the data is associated with the audio communication. In some implementations, the source determination module 436 may make this determination by determining whether the sender of the data is a participant in the audio communication. For example, the source determination module 436 may determine that electronic device B 416 is the sender of the data (e.g., by examining the source address). The source determination module 436 may also determine that electronic device B 416 is a participant in the audio communication (e.g., by examining the called party address). In some implementations, the called party address may include the phone number of electronic device B 416. Thus, the source determination module 436 may determine that electronic device B 416 is associated with the audio communication.

In other implementations, the source determination module 436 may determine that the sender of the data is associated with the audio communication if the sender of the data has an association with a participant to the audio communication. For example, the source determination module 436 may determine that electronic device B 416 is a participant in the audio communication (e.g., by examining the called party address). In some implementations, the called party address may include the phone number of electronic device B 416. The source determination module 436 may also determine that another electronic device is a sender of the data (e.g., by examining the source address). The source determination module 436 may also determine whether there is an association between electronic device B 416 and the other electronic device (e.g., by identifying an association identified in the data). Thus, the source determination module 436 may determine that electronic device B 416 is associated with a participant in the audio communication. In some implementations, the source determination module 436 may independently determine that electronic device B 416 is associated with a participant in the audio communication.

In some implementations, electronic device A 402 may be in communication with a display 444. As described above, in certain examples, the data may include instructions directing electronic device A 402 to display information based on the data. In this example, electronic device A 402 may display the information on the display 444.

Electronic device A 402 may be connected to electronic device B 416. Electronic device B 416 may include one or more of operations module B 422, transmit chain B 418 and receive chain B 420 similar to corresponding elements described in connection with FIG. 1. Electronic device B 416 may communicate with electronic device A 402 through a network 430 similar to the network 130 describe in connection with FIG. 1. In some implementations, operations module B 422 may include one or more of audio communications module B 424, a data module 426 and a device identification module 428 similar to corresponding elements described in connection with FIG. 1.

In some implementations, audio communications module B 424 may include message generator B 440. In some implementations, message generator B 440 generates the one or more messages to establish an audio communication. For example, message generator B 440 may generate an invite message requesting electronic device A 402 to join in an audio communication. Message generator B 440 may also generate an ACK message indicating that a response message has been received. Message generator B 440 may also reply to an invite message received from electronic device A 402. In some implementations, message generator B 440 may reply by sending one or more messages. In some implementations, message generator B 440 may send and receive other messages pertaining to the status of the audio communication. For example, message generator B 440 may send an ACK message indicating that data has been received. In some implementations, message generator B 440 may generate messages based on the SIP. In this example, an SIP proxy 448 may receive the message sent by audio communications module B 424 and transmit at least a portion of the message onto electronic device A 402. In certain examples, the SIP proxy 448 may enforce policies of the protocol and rewrite at least a portion of the message before transmitting the message on to electronic device A 402.

In some examples, source identification module B 446 may obtain information that identifies electronic device B 416. Information that identifies electronic device B 416 could include a phone number. According to one example, source identification module B 446 may supply the identification information (e.g., a phone number) to the data module 426 to be included in the data. For example, the data may include a source address (e.g., a "From:" field) indicating the sender of the data (e.g., a phone number pertaining to electronic device B 416). In this example, source identification module B 446 may supply the identification information to the data module 426 so that it may be incorporated into the data.

It should be noted that one or more of the elements or parts thereof included in the electronic devices 402, 416 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 5:
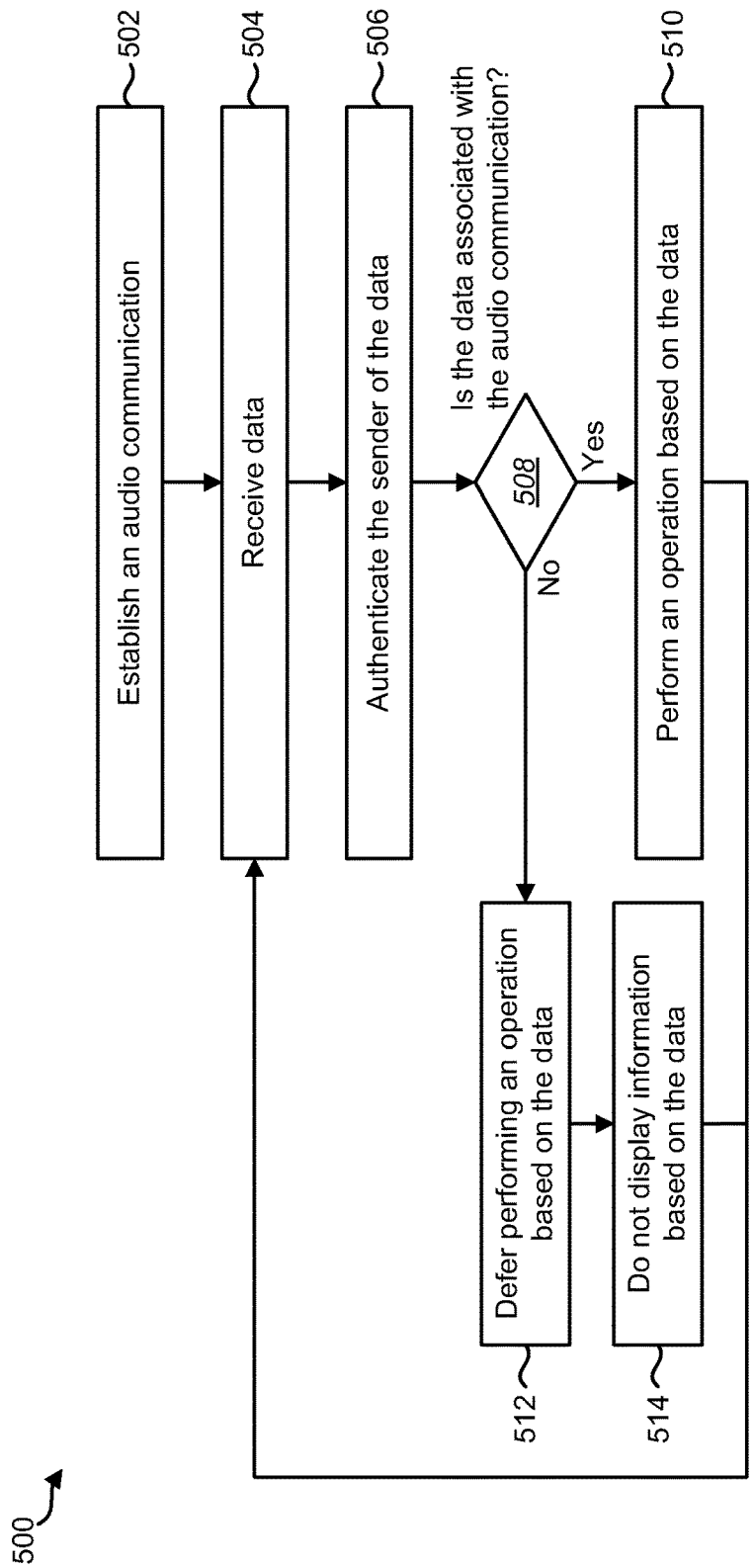
FIG. 5 is a flow diagram illustrating another configuration of a method for managing data associated with an audio communication by an electronic device.

FIG. 5 is a flow diagram illustrating another configuration of a method 500 for managing data associated with an audio communication. In some approaches, the electronic devices 402, 416 may establish 502 an audio communication. In some implementations this may be done as described in connection with FIG. 2.

Electronic device A 402 may receive 504 data. In some implementations this may be done as described in connection with FIG. 2.

In some implementations, electronic device A 402 may authenticate 506 the sender of the data. In some implementations, electronic device A 402 may authenticate 506 the sender of the data based on information contained in the data. As described above, in some implementations, the data may include a source address (e.g., a phone number). In this example, electronic device A 402 may examine and source address and authenticate the identification of the sender. Other examples of authenticating the sender of the data include, identifying a valid IP address, requiring password input and identifying a valid device name. In some examples, electronic device A 402 may authenticate 506 the sender of the data based on the SIP proxy 448. For example, the SIP proxy 448 may identify the IMS address of the sender (e.g., electronic device B 416). If the IMS address is valid, electronic device A 402 may authenticate the sender. If the IMS address is not valid, electronic device A 402 may not authenticate the sender. In some implementations, electronic device A 402 may independently authenticate 506 the sender of the data.

Electronic device A 402 may determine 508 if the data is associated with the audio communication. In some implementations, this may be done as described in connection with FIG. 2.

If the data is associated with the audio communication, electronic device A 402 may perform 510 an operation based on the data. In some implementations this may be done as described in connection with FIG. 2. In some implementations, after performing 510 an operation based on the data, electronic device A 402 may return to receive 504 data. In some implementations, operations may continue in accordance with the method until the audio communication ends.

If the data is not associated with the audio communication, electronic device A 402 may defer 512 performing an operation based on the data. In this example, electronic device A 402 may wait until any operation based on data that is associated with the audio communication has been performed. For example, electronic device A 402 may defer performing an operation based on data not associated with the audio communication (e.g., launch an application), until after an operation based on data associated with the audio communication (e.g., retrieve information) has been performed. In this example, electronic device A 402 may store the data not associated with the audio communication in a non-volatile memory (not shown) in communication with electronic device A 402.

If the data includes instructions to display information, electronic device A 402 may not display 514 information based on the data. For example, if the data is not associated with the audio communication and includes instructions to display a user-selectable menu, electronic device A 402 may not 514 display the user-selectable menu. In this example, electronic device A 402 may display the user-selectable menu after operations based on data associated with the audio communication have been performed. According to some approaches, electronic device A 402 may store the user-selectable menu in a non-volatile memory storage in communication with electronic device A 402. In some examples, if the data is not associated with the audio communication, electronic device A 402 may return to receive 504 data associated with the audio communication.

Figure 6:
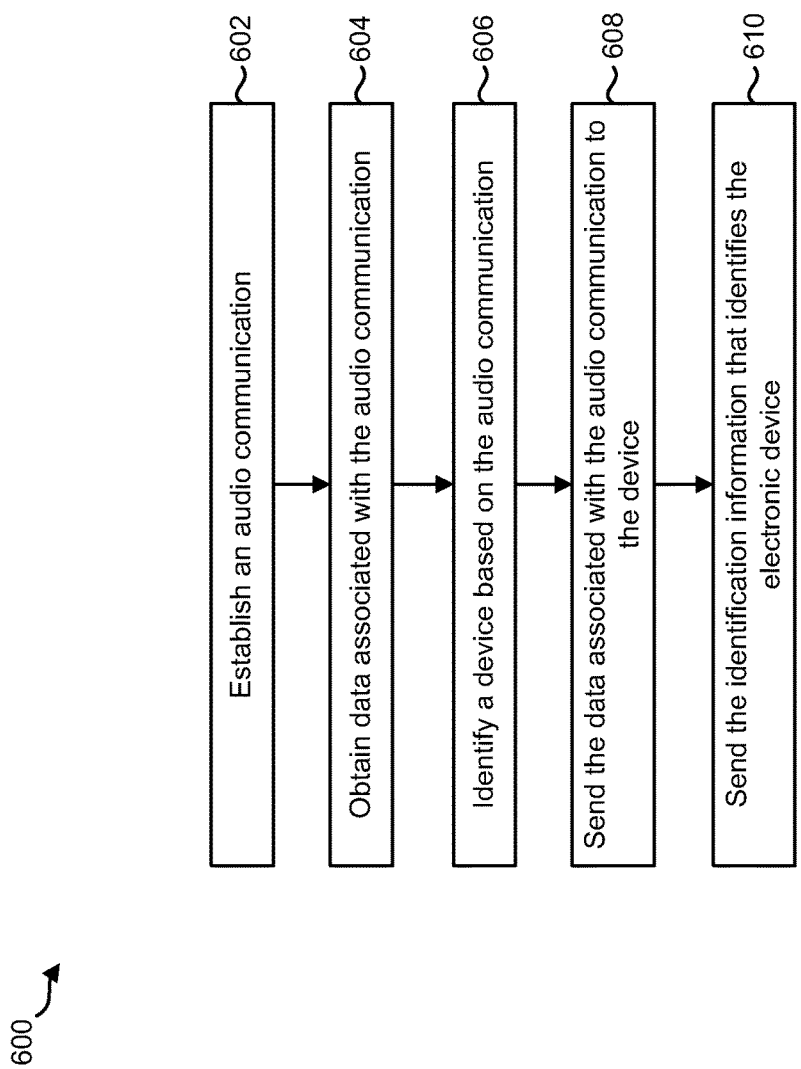
FIG. 6 is a flow diagram illustrating another configuration of a method for sending data associated with an audio communication by an electronic device.

FIG. 6 is a flow diagram illustrating another configuration of a method 600 for sending data. In some implementations, the electronic devices 402, 416 may establish 602 an audio communication. In some implementations, this may be done as described in connection with FIG. 3.

Electronic device B 416 may obtain 604 data associated with the audio communication. In some implementations, this may be done as described in connection with FIG. 3.

Electronic device B 416 may identify 606 a device based on the audio communication. In some implementations, this may be done as described in connection with FIG. 3.

Electronic device B 416 may send 608 the data associated with the audio communication to the device. In some implementations, this may be done as described in connection with FIG. 3.

In some implementations, electronic device B 416 may send 610 identification information that identifies electronic device B 416. In some implementations the identification information may be included in the data. For example, the data may include a source address identifying the sender of the data. In some implementations, electronic device B 416 may supply the identification information to be included in the source address of the data.

Figure 7:
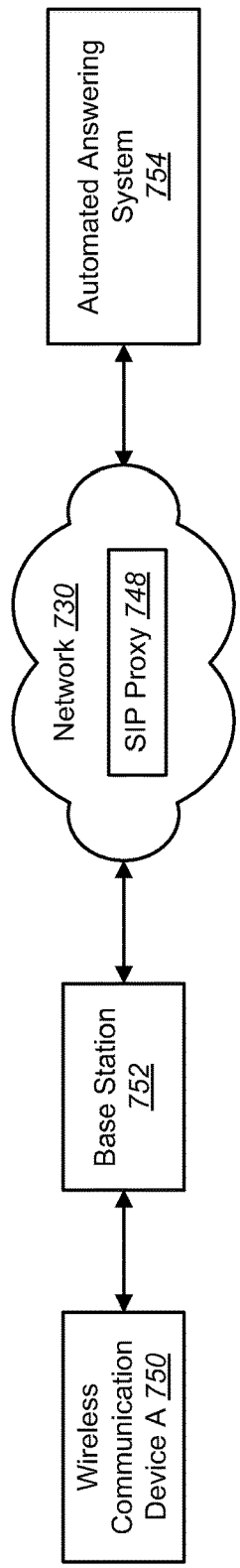
FIG. 7 is an example of an electronic device and an automated answering system in which systems and methods for managing data associated with an audio communication may be implemented.

FIG. 7 is an example of wireless communication device A 750 and an automated answering system 754 in which systems and methods for managing data associated with an audio communication may be implemented. According to some implementations, one or more of the electronic devices 102, 116, 402 and 416 described herein may be implemented in accordance with wireless communication device A 750 described in connection with FIG. 7. In some implementations, wireless communication device A 750 may be in communication with a base station 752. In some implementations the base station 752 may provide a communication channel through which wireless communication device A 750 may establish audio communication with automated answering system 754.

In some implementations, one or more of electronic devices 102, 116, 402 and 416 described herein may be implemented in accordance with automated answering system 754. In some implementations wireless communication device A 750 (via the base station 752) may communicate with the automated answering system 754 via a network 730 similar to the network 130 described in connection with FIG. 1. In some implementations, communications between wireless communication device A 750 (via the base station 752) and the automated answering system 754 may be based on the SIP. For example, wireless communication device A 750 and automated answering system 754 may communicate via an SIP proxy 748 similar to the SIP proxy 448 described in connection with FIG. 4.

Figure 8:
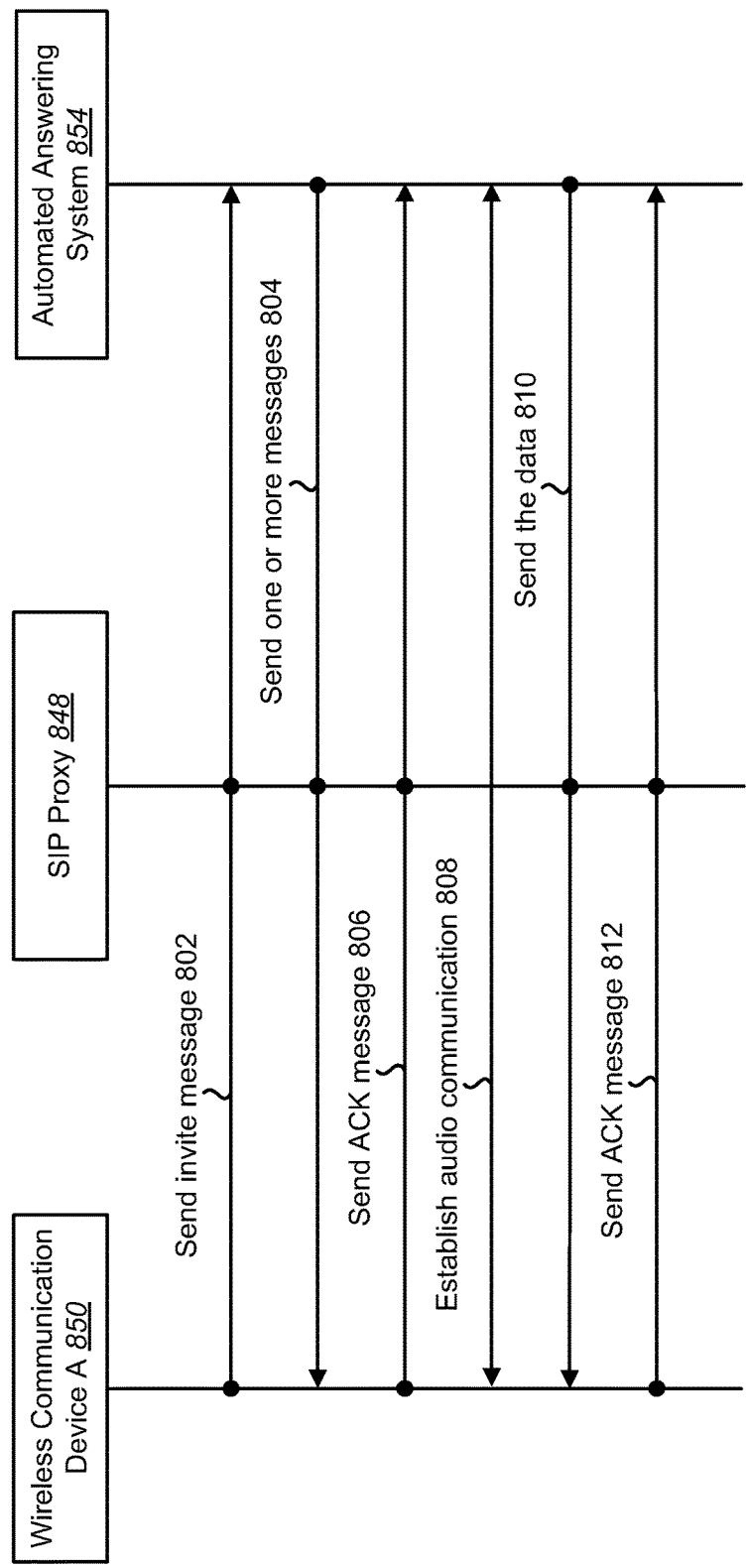
FIG. 8 is a thread diagram illustrating one example of a method for managing data associated with an audio communication by an electronic device and an automated answering system.

FIG. 8 is a thread diagram illustrating one example of a method for managing data associated with an audio communication by wireless communication device A 850 and an automated answering system 854. According to some implementations, wireless communication device A 850, SIP proxy 848 and automated answering system 854 may be similar to corresponding elements described in connection with FIG. 7. Wireless communication device A 850 and the automated answering system 854 may establish an audio communication. One example of establishing an audio communication is given as follows. Wireless communication device A 850 may send 802 an invite message to the automated answering system 854. In response, the automated answering system 854 may send 804 one or more messages. For example, the automated answering system 854 may send a message indicating that the automated answering system 854 has received the invite message. The automated answering system 854 may also send a session progress message (e.g., "183 Session Progress") indicating the status of audio communication. Other examples of the one or more messages include, a ringing message (e.g., "180 Ringing") a message indicating the automated answering system 854 has picked up the audio communication (e.g., "200 OK".) In certain examples, wireless communication device A 850 may send an ACK message 806 acknowledging receipt of the one or more messages. As a result of the messages, wireless communication device A 850 and the automated answering system 854 may establish 808 an audio communication.

In some implementations, the automated answering system 854 may send 810 the data (e.g., "message") associated with the audio communication. Upon reception of the data, wireless communication device A 850 may send 812 an ACK message indicating receipt of the data. According to some examples, the messages may be transmitted via the SIP proxy 848. In these examples, the SIP proxy 848 may receive a message from one entity and transmit at least a portion of that message to another entity. In some configurations, the SIP proxy 848 may send a message (e.g., "202 accepted") to the automated answering system 854 indicating that the data has been received by the SIP proxy 848. The SIP proxy 848 may also receive a message (e.g., "200 OK") from the wireless communication device A 850 indicating that the data has been received by wireless communication device A 850.

Figure 9:
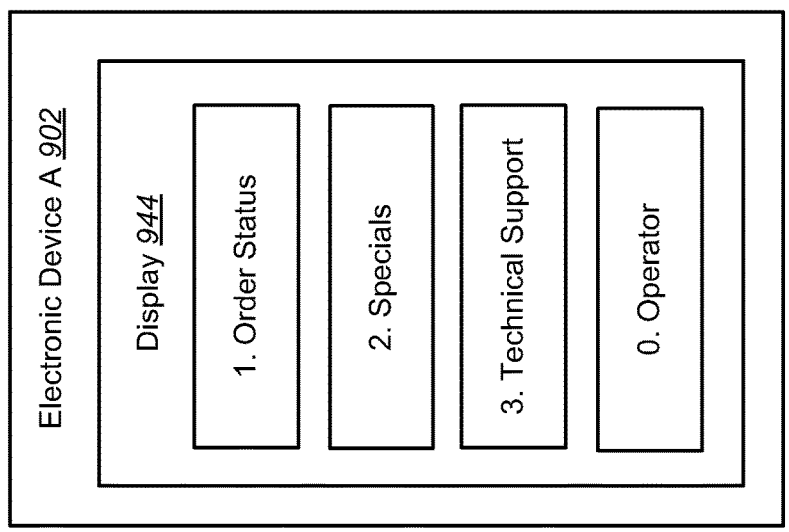
FIG. 9 is an example of a menu in which systems and methods for managing data associated with an audio communication may be implemented.

FIG. 9 is an example of a menu in which systems and methods for managing data associated with an audio communication may be implemented. According to some examples, electronic device A 902 and display 944 may be similar to corresponding elements described in connection with FIG. 4. In some examples, the data may direct electronic device A 902 to display a user-selectable menu. The data may also include instructions to perform operations based on the selection from the menu. For example, the menu may allow a user of electronic device A 902 to select from one or more options. As the user selects an option, the instructions may direct electronic device A 902 to perform an operation based on the selection. For example, if a user selects the "1. Order Status" option, the data may direct electronic device A 902 to display a status of an order. By comparison, if a user selects the "0. Operator" option, the data may instruct electronic device A 902 to connect to an operator.

Figure 10:
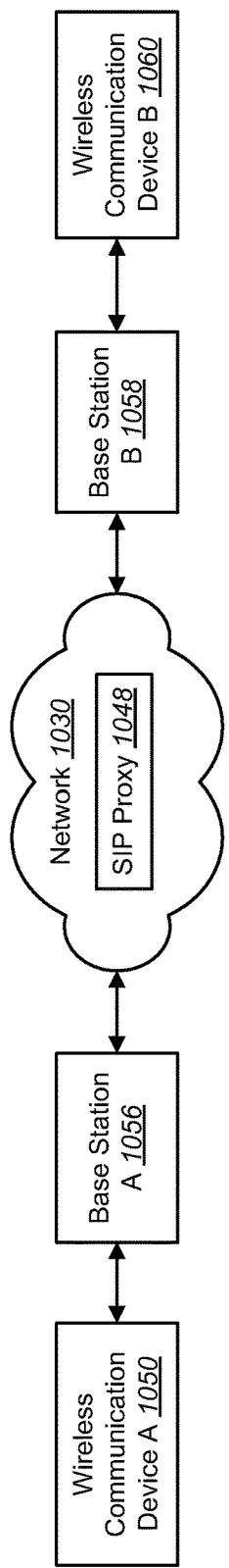
FIG. 10 is an example of electronic devices in which systems and methods for managing data associated with an audio communication may be implemented.

FIG. 10 is an example of wireless communication devices 1050, 1060 in which systems and methods for managing data associated with an audio communication may be implemented. According to some implementations, one or more of the electronic devices 102, 116, 402 and 416 described herein may be implemented in accordance with the wireless communication devices 1050, 1060 described in connection with FIG. 10. In some implementations the base stations 1056, 1058 may be similar to the base station 752 described in connection with FIG. 7. In some implementations wireless communication device A 1050 may communicate with wireless communication device B 1060 via a network 1030 similar to the network 130 described in connection with FIG. 1. In some implementations, communications between wireless communication device A 1050 (via base station A 1056) and wireless communication device B 1060 (via base station B 1058) may be based on the SIP. For example, wireless communication device A 1050 and wireless communication device B 1060 may communicate via an SIP proxy 1048 similar to the SIP proxy 448 described in connection with FIG. 4.

Figure 11:
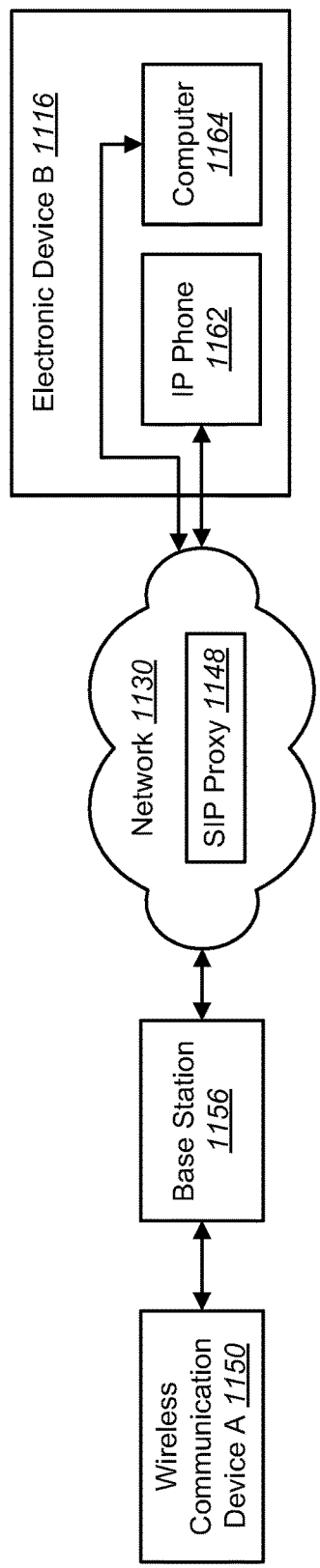
FIG. 11 is an example of electronic devices in which systems and methods for managing data associated with an audio communication may be implemented.

FIG. 11 is an example of wireless communication device A 1150 and electronic device B 1116 in which systems and methods for managing data associated with an audio communication may be implemented. According to some implementations, one or more of the electronic devices 102, 116, 402 and 416 described herein may be implemented in accordance with wireless communication device A 1150 and electronic device B 1116 described in connection with FIG. 11. In some implementations the base station 1156 may be similar to the base station 752 described in connection with FIG. 7. In some implementations wireless communication device A 1150 may communicate with electronic device B 1116 via a network 1130 similar to the network 130 described in connection with FIG. 1. In some implementations, communications between wireless communication device A 1150 (via the base station 1156) and electronic device B 1116 may be based on the SIP. For example, wireless communication device A 1150 and electronic device B 1116 may communicate via an SIP proxy 1148 similar to the SIP proxy 448 described in connection with FIG. 4.

As described above, in some implementations, the sender of the data may not be a participant in the audio communication. An example of methods for managing data associated with an audio communication in this implementation is given as follows. In an example, electronic device B 1116 may include an IP phone 1162. In some implementations, the IP phone 1162 may be a device through which an audio communication is established. Electronic device B 1116 may also include a computer 1164. In some implementations, the computer 1164 may be a device through which data is obtained and sent to wireless communication device A 1150. In some configurations, the IP phone 1162 and the computer 1164 may be included in the same electronic device. Alternatively, in other configurations, the IP phone 1162 and the computer 1164 may be separate. As described above, a determination module 112 may determine whether the sender of the data is associated with a participant in the audio communication. In this example, the determination module 112 may associate the sender of the data (e.g., the computer 1164) with the participant in the audio communication (e.g., the IP phone 1162). The determination module 112 may associate the sender of the data with the participant in the audio communication based on information included in the data. For example, the data may expressly indicate the association. An example of data that expressly indicates the association is given in Listing (2). In this example, the data may include a source address identifying the computer 1164 as the sender of the data. The data may also indicate an association to the called party address pertaining to the IP phone 1162.

Figure 12:
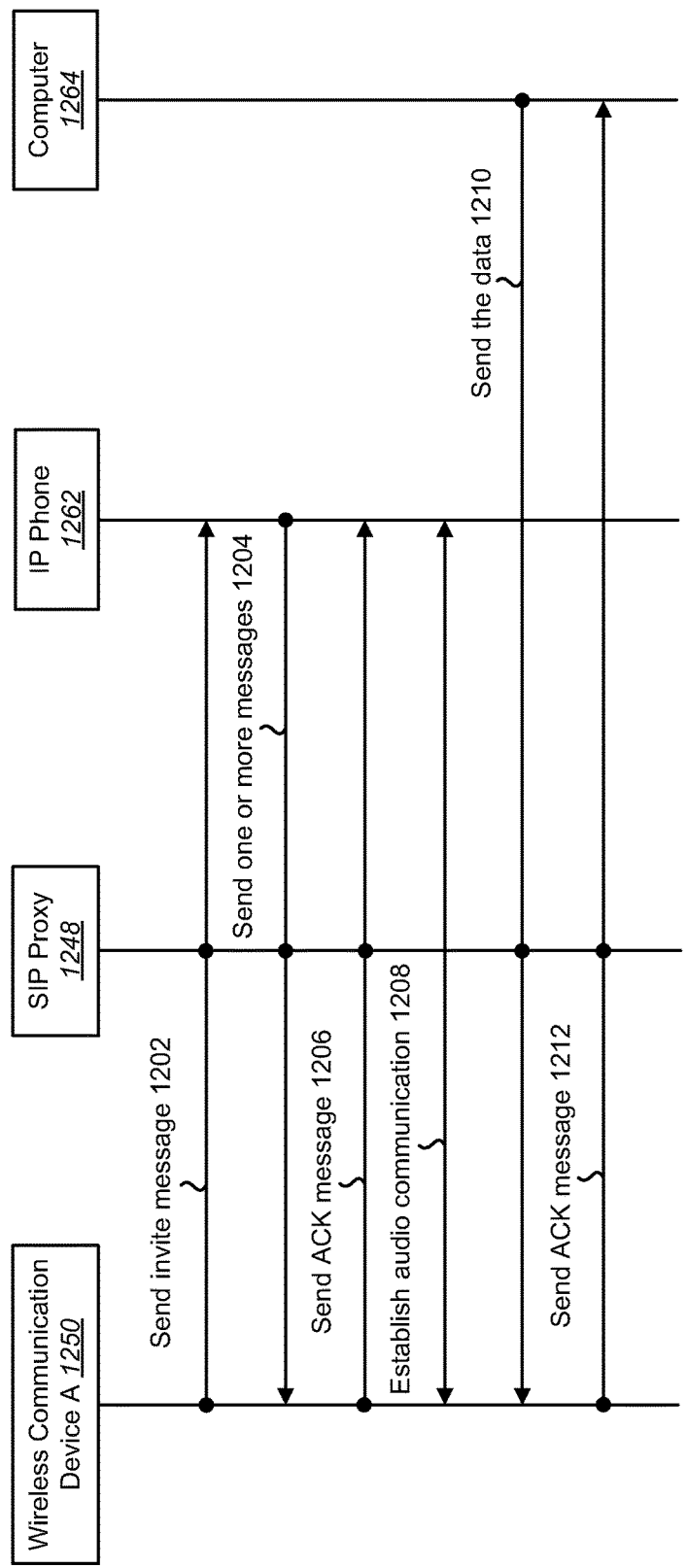
FIG. 12 is a thread diagram illustrating one example of a method for managing data associated with an audio communication by electronic devices.

FIG. 12 is a thread diagram illustrating one example of a method for managing data associated with an audio communication by wireless communication device A 1250, an IP phone 1262 and a computer 1264. According to some implementations, wireless communication device A 1250, an SIP proxy 1248 and the computer 1264 may be similar to corresponding elements described in connection with FIG. 11. One example of establishing an audio communication is given as follows. Wireless communication device A 1250 may send 1202 an invite message to the IP phone 1262. In response, the IP phone 1262 may send 1204 one or more messages. For example, the IP phone 1262 may send 1204 a message indicating that the IP phone 1262 has received the invite message. The IP phone 1262 may also send a session progress message (e.g., "183 Session Progress") indicating the status of the audio communication. Other examples of the one or more messages include a ringing message (e.g., "180 ringing") and a message indicating that the IP phone 1262 has picked up the audio communication (e.g., "200 OK"). In certain examples, wireless communication device A 1250 may send an ACK message 1206 acknowledging receipt of the one or more messages. As a result of the messages, wireless communication device A 1250 and the IP phone 1262 may establish 1208 an audio communication.

In some implementations, the computer 1264 may send 1210 the data associated with the audio communication. Upon reception of the data, wireless communication device A 1250 may send 1212 an ACK message indicating receipt of the data. According to some examples, the messages may be transmitted via the SIP proxy 1248. In these examples, the SIP proxy 1248 may receive a message from one entity and transmit at least a portion of that message to another entity. In some configurations, the SIP proxy 1248 may send a message (e.g., "202 accepted") to the computer 1264 indicating that the data has been received by the SIP proxy 1248. The SIP proxy 1248 may also receive a message (e.g., "200 OK") from wireless communication device A 1250 indicating that the data has been received by wireless communication device A 1250.

Figure 13:
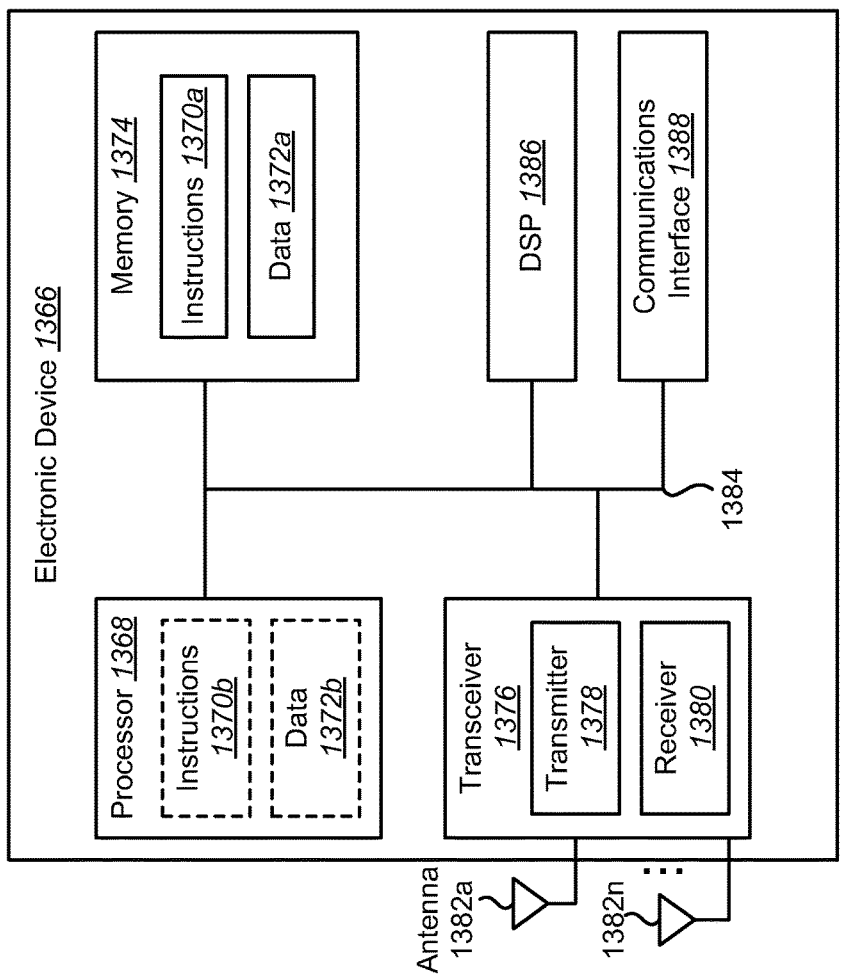
FIG. 13 illustrates various components that may be utilized in an electronic device.

FIG. 13 illustrates various components that may be utilized in an electronic device 1366. One or more of the electronic devices 102, 116, 402 and 416 described herein may be implemented in accordance with the electronic device 1366 described in connection with FIG. 13. The electronic device 1366 includes a processor 1368 that controls operation of the electronic device 1366. The processor 1368 may also be referred to as a central processing unit (CPU). Memory 1374, which may include read-only memory (ROM), random access memory (RAM), a combination of the two or any type of device that may store information, provides instructions 1370a and data 1372a to the processor 1368. A portion of the memory 1374 may also include non-volatile random access memory (NVRAM). Instructions 1370b and data 1372b may also reside in the processor 1368. Instructions 1370b and/or data 1372b loaded into the processor 1368 may also include instructions 1370a and/or data 1372a from memory 1374 that are loaded for execution or processing by the processor 1368. The instructions 1370b may be executed by the processor 1368 to implement the one or more of the methods 200, 300, 500 and 600 described above.

The electronic device 1366 may also include a housing that contains one or more transmitters 1378 and one or more receivers 1380 to allow transmission and reception of data. The transmitter(s) 1378 and receiver(s) 1380 may be combined into one or more transceivers 1376. One or more antennas 1382a-n are attached to the housing and electrically coupled to the transceiver 1376.

The various components of the electronic device 1366 are coupled together by a bus system 1384, which may include a power bus, a control signal bus and a status signal bus, in addition to a data bus. However, for the sake of clarity, the various buses are illustrated in FIG. 13 as the bus system 1384. The electronic device 1366 may also include a digital signal processor (DSP) 1386 for use in processing signals. The electronic device 1366 may also include a communications interface 1388 that provides user access to the functions of the electronic device 1366. The electronic device 1366 illustrated in FIG. 13 is a functional block diagram rather than a listing of specific components.

Figure 14:
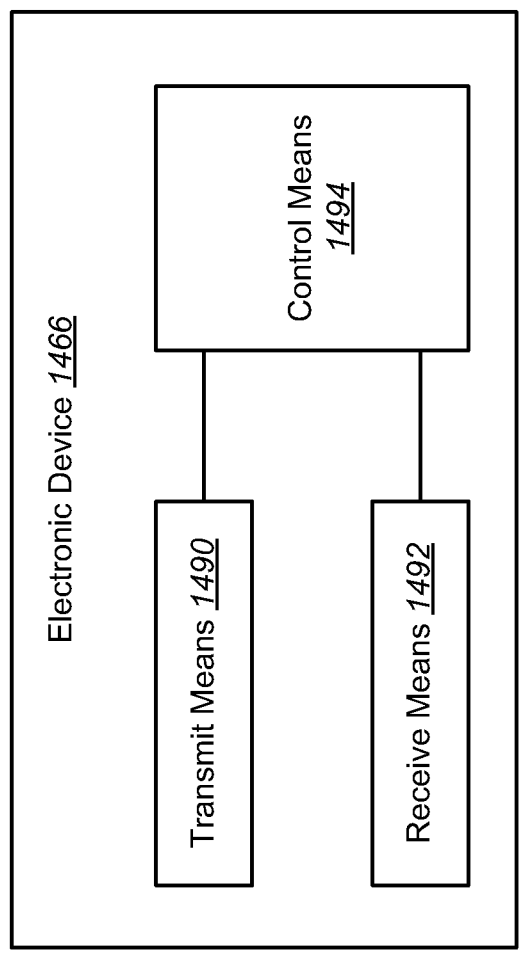
FIG. 14 is a block diagram illustrating one configuration of an electronic device in which systems and methods for managing data associated with an audio communication may be implemented.

FIG. 14 is a block diagram illustrating one configuration of an electronic device 1466 in which systems and methods for managing data associated with an audio communication may be implemented. The electronic device 1466 includes transmit means 1490, receive means 1492 and control means 1494. The transmit means 1490, receive means 1492 and control means 1494 may be configured to perform one or more of the functions described in connection with FIGS. 2, 3, 5 and 6. FIG. 13 above illustrates one example of a concrete apparatus structure of FIG. 14. Other various structures may be implemented to realize one or more of the functions of FIGS. 2, 3, 5 and 6. For example, a DSP may be realized by software.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for managing non-voice data associated with an audio communication voice call comprising:
    a processor; and
    memory in electronic communication with the processor, wherein instructions stored in the memory are executable to:
    establish an audio communication voice call with a second electronic device over a network using an audio communication application, wherein the audio communication application is presented on a foreground of a display;
    receive non-voice data over the network during the audio communication voice call;
    determine whether the non-voice data is associated with the audio communication voice call, wherein the non-voice data is associated with the audio communication voice call when the non-voice data includes an association field indicating an address of the second electronic device used in the audio communication voice call;
    in response to determining that the non-voice data is associated with the audio communication voice call, preempt at least a portion of the audio communication application being presented on the foreground of the display and allocate a first part of the display to display information based on the non-voice data that is associated with the audio communication voice call; and
    in response to determining that the non-voice data is not associated with the audio communication voice call, allocate less than the first part of the display to display information based on the non-voice data that is not associated with the audio communication voice call.

2. The electronic device of claim 1, wherein the instructions are further executable to defer performing an operation based on the non-voice data received over the network when the non-voice data received over the network is not associated with the audio communication voice call.

3. The electronic device of claim 1, wherein the instructions are further executable to not display information based on the non-voice data received over the network when the non-voice data received over the network is not associated with the audio communication voice call.

4. The electronic device of claim 1, wherein the instructions are further executable to prioritize one or more additional operations based on the non-voice data received over the network when the non-voice data received over the network is associated with the audio communication voice call.

5. The electronic device of claim 1, wherein the instructions are further executable to determine whether other operations are authorized.

6. The electronic device of claim 1, wherein the instructions executable to determine whether the non-voice data received over the network is associated with the audio communication voice call further comprise instructions executable to:
    identify a sender of the non-voice data received over the network; and
    determine whether the sender of the non-voice data received over the network is associated with the audio communication voice call.

7. The electronic device of claim 6, wherein the instructions are further executable to authenticate the sender of the non-voice data received over the network.

8. The electronic device of claim 1, wherein receiving the non-voice data over the network is based on a session initiation protocol (SIP).

9. The electronic device of claim 8, wherein the SIP identifies a sender of the non-voice data received over the network.

10. The electronic device of claim 1, wherein the instructions executable to establish an audio communication voice call further comprise instructions executable to send one or more messages.

11. The electronic device of claim 1, wherein the instructions are further executable to terminate operations when the audio communication voice call ends.

12. A method for managing non-voice data associated with an audio communication voice call by an electronic device, comprising:
    establishing an audio communication voice call with a second electronic device over a network using an audio communication application, wherein the audio communication application is presented on a foreground of a display;
    receiving non-voice data over the network during the audio communication voice call;
    determining whether the non-voice data is associated with the audio communication voice call, wherein the non-voice data is associated with the audio communication voice call when the non-voice data includes an association field indicating an address of the second electronic device used in the audio communication voice call;
    in response to determining that the non-voice data is associated with the audio communication voice call, preempting at least a portion of the audio communication application being presented on the foreground of the display and allocating a first part of the display to display information based on the non-voice data that is associated with the audio communication voice call; and
    in response to determining that the non-voice data is not associated with the audio communication voice call, allocating less than the first part of the display to display information based on the non-voice data that is not associated with the audio communication voice call.

13. The method of claim 12, further comprising deferring performing an operation based on the non-voice data received over the network when the non-voice data received over the network is not associated with the audio communication voice call.

14. The method of claim 12, further comprising not displaying information based on the non-voice data received over the network when the non-voice data received over the network is not associated with the audio communication voice call.

15. The method of claim 12, further comprising prioritizing one or more additional operations based on the non-voice data received over the network when the non-voice data received over the network is associated with the audio communication voice call.

16. The method of claim 12, further comprising determining whether other operations are authorized.

17. The method of claim 12, wherein determining whether the non-voice data received over the network is associated with the audio communication voice call further comprises:
    identifying a sender of the non-voice data received over the network; and
    determining whether the sender of the non-voice data received over the network is associated with the audio communication voice call.

18. The method of claim 17, further comprising authenticating the sender of the non-voice data received over the network.

19. The method of claim 12, wherein receiving the non-voice data over the network is based on a session initiation protocol (SIP).

20. The method of claim 19, wherein the SIP identifies a sender of the non-voice data received over the network.

21. The method of claim 12, wherein establishing an audio communication voice call further comprises sending one or more messages.

22. The method of claim 12, further comprising terminating operations when the audio communication voice call ends.

23. The electronic device of claim 1, wherein the association field is a source address of the non-voice data.

24. The electronic device of claim 1, wherein the association field is separate from a source address of the non-voice data.

* * * * *